US008644374B2

(12) United States Patent
Chou et al.

(10) Patent No.: US 8,644,374 B2
(45) Date of Patent: Feb. 4, 2014

(54) MULTIPLE DESCRIPTION CODING WITH SPATIAL SHIFTING

(75) Inventors: Jim Chen Chou, San Jose, CA (US); Junlin Li, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 660 days.

(21) Appl. No.: 12/550,487

(22) Filed: Aug. 31, 2009

(65) Prior Publication Data

US 2011/0051804 A1   Mar. 3, 2011

(51) Int. Cl.
*H04B 1/66* (2006.01)
*H04N 7/12* (2006.01)
*H04N 11/02* (2006.01)
*H04N 11/04* (2006.01)
*H04L 12/28* (2006.01)
*H04L 12/56* (2011.01)

(52) U.S. Cl.
USPC ............... 375/240; 375/240.03; 375/240.12; 375/240.18; 375/240.21; 375/240.24; 375/240.25; 348/398.1; 348/390.1; 348/421.1; 370/395.42; 370/395.21

(58) Field of Classification Search
None
See application file for complete search history.

(56) References Cited

U.S. PATENT DOCUMENTS

| 6,101,278 | A  | * | 8/2000 | Chen et al. ............... 382/239 |
| 6,556,624 | B1 | * | 4/2003 | Orchard et al. .......... 375/240.12 |
| 2004/0102968 | A1 | * | 5/2004 | Tian et al. ................. 704/226 |
| 2005/0243835 | A1 | * | 11/2005 | Sharma et al. ........... 370/395.42 |
| 2006/0072669 | A1 | * | 4/2006 | Lin et al. ................. 375/240.24 |
| 2008/0174612 | A1 | * | 7/2008 | Someya et al. .............. 345/690 |
| 2009/0034614 | A1 | * | 2/2009 | Liu et al. ................. 375/240.11 |
| 2009/0074074 | A1 | * | 3/2009 | Au et al. .................. 375/240.18 |
| 2010/0027678 | A1 | * | 2/2010 | Alfonso .................... 375/240.21 |

FOREIGN PATENT DOCUMENTS

EP   2066064 A2 *  6/2009   ............... H04L 1/18

OTHER PUBLICATIONS

Vitali et al., "Video Over IP Using Standard-Compatible Multiple Description Coding: an IETF Proposal," J Zhejiang Univ. Science A 2006 7(5): 668-676.

D. Wang, et al., "Slice Group Based Multiple Description Video Coding Using Motion Vector Estimation", 2004 International Conference on Image Processing; pp. 3237-3240.

* cited by examiner

*Primary Examiner* — Joseph Ustaris
*Assistant Examiner* — Edemio Navas, Jr.
(74) *Attorney, Agent, or Firm* — Edell, Shapiro & Finnan, LLC

(57) ABSTRACT

Techniques are provided herein to shift at an encoding device a portion of a video sequence by a first predetermined number of pixels horizontally and by a first predetermined number of pixels vertically to produce a shifted first portion of the video sequence. The shifted first portion of the video sequence is encoded to produce a first video description. The portion of the video sequence is shifted by a second predetermined number of pixels horizontally and by a second predetermined number of pixels vertically to produce a shifted second portion of the video sequence. The shifted second portion of the video sequence is encoded to produce a second video description, and the first video description and the second video description are transmitted. The techniques are scalable to shift and encode the portion of the video sequence a plurality of times to produce any number of video descriptions. Similarly, techniques are provided herein to perform such functions in reverse at a decoder.

21 Claims, 5 Drawing Sheets

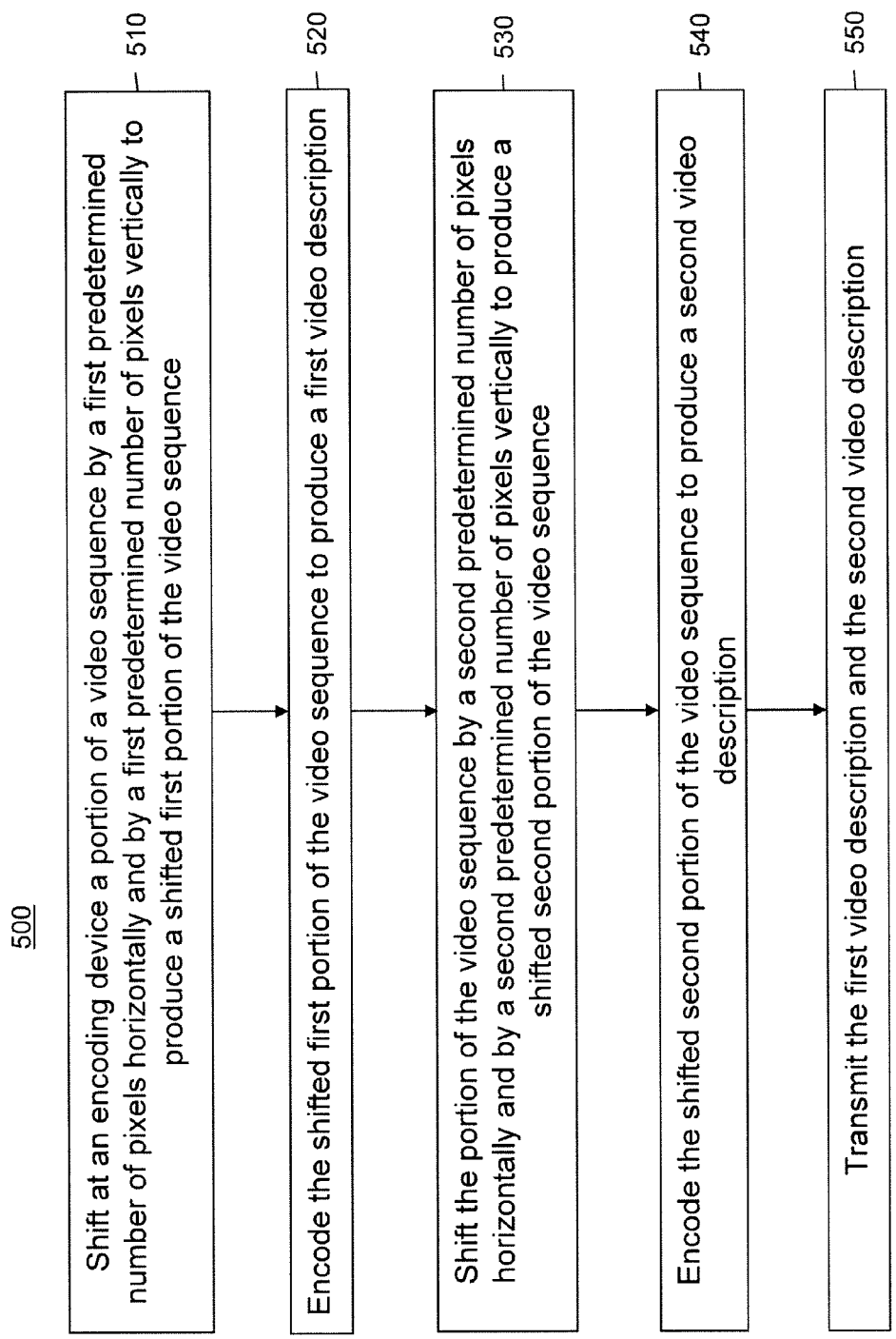

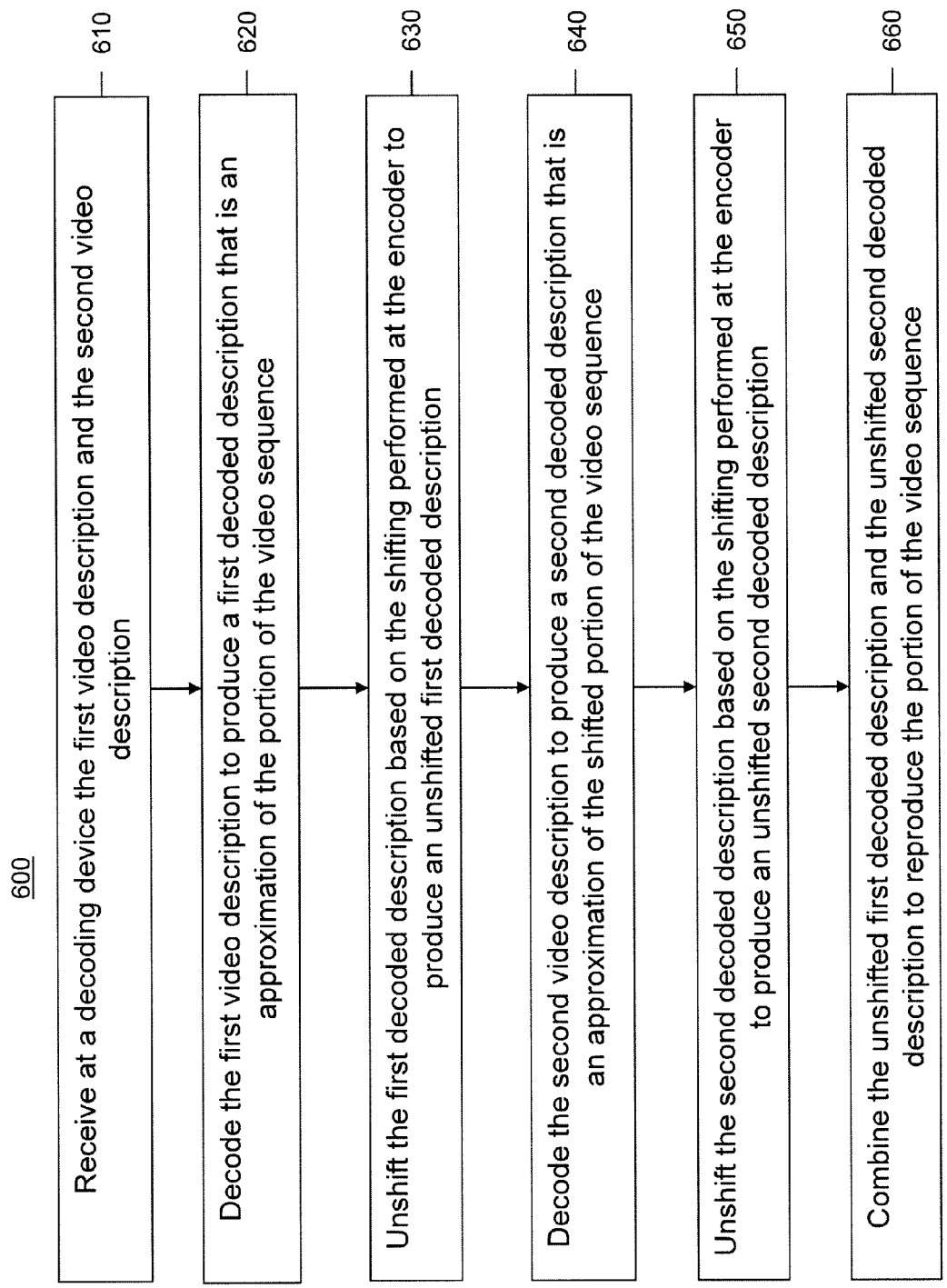

MULTIPLE DESCRIPTION CODING WITH SPATIAL SHIFTING

TECHNICAL FIELD

The present disclosure relates to encoding and decoding video and more particularly to multiple description coding with reduced error rate characteristics.

BACKGROUND

Multiple description coding (MDC) is a coding technique which encodes a video sequence into n independent sub streams (n>=2), referred to as descriptions. The packets of each description are routed over multiple, and sometimes partially disjoint, paths. In order to decode the media stream, any description can be used; however, the quality improves with the number of descriptions received in parallel.

MDC techniques provide error resilience to media streams. Since an arbitrary subset of descriptions can be used to decode the original stream, network congestion or packet loss, which is common in networks such as the Internet, will not interrupt the stream but only cause a temporary loss of quality. The quality of a stream can be expected to be roughly proportional to the data rate sustained by the receiver.

BRIEF DESCRIPTION OF THE DRAWINGS

FIG. 5 is an example flow chart generally depicting a process for spatially generating multiple descriptions for a portion of a video sequence with reduced error rate characteristics.

FIG. 6 is an example flow chart generally depicting a process for spatially combining decoded multiple descriptions to reproduce a portion of a video sequence.

DESCRIPTION OF EXAMPLE EMBODIMENTS

Overview

Figure 1:
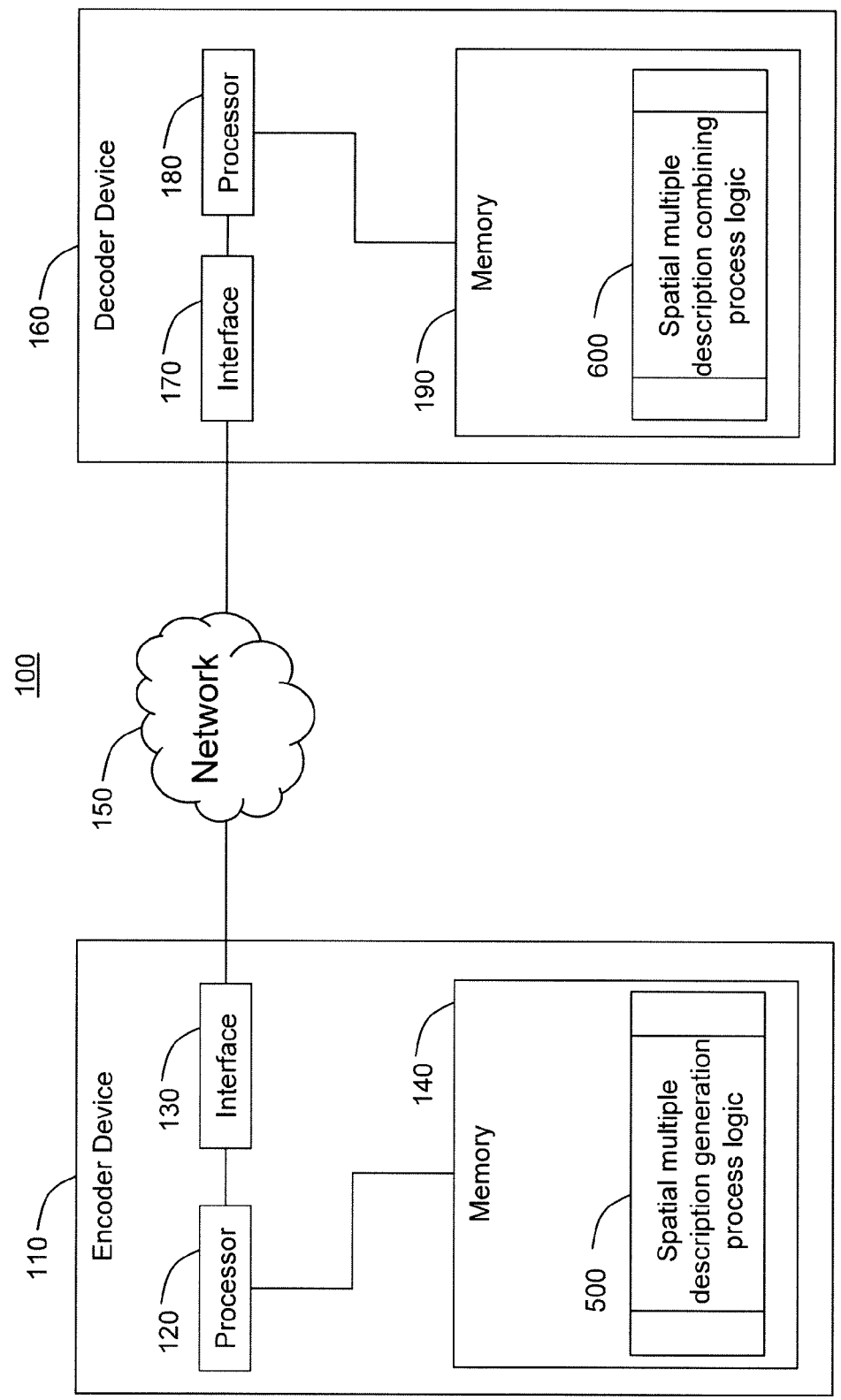
FIG. 1 is a block diagram showing an example of a network in which an encoding device sends spatially generated multiple descriptions to a decoding device.

Techniques are provided herein to shift at an encoding device a portion of a video sequence by a first predetermined number of pixels horizontally and by a first predetermined number of pixels vertically to produce a shifted first portion of the video sequence. The shifted first portion of the video sequence is encoded to produce a first video description. The portion of the video sequence is shifted by a second predetermined number of pixels horizontally and by a second predetermined number of pixels vertically to produce a shifted second portion of the video sequence. The shifted second portion of the video sequence is encoded to produce a second video description, and the first video description and the second video description are transmitted. These techniques may be expanded or scaled to shift and encode the portion of the video sequence a plurality of times to produce any number of video descriptions.

Similarly, techniques are provided herein to recover a video sequence that is encoded as described herein. At a decoding device, the first video description and the second video description are received. The first video description is decoded to produce a first decoded description. The first decoded description is unshifted by the first predetermined number of pixels horizontally and by the first predetermined number of pixels vertically to produce an unshifted first decoded description. The second video description decoded to produce a second decoded description. The second decoded description is unshifted by the second predetermined number of pixels horizontally and by the second predetermined number of pixels vertically to produce an unshifted second decoded description. The unshifted first video description and the unshifted second decoded description are combined to reproduce the portion of the video sequence. These techniques are expandable or scalable to decode, unshift, and combine a plurality of video descriptions.

Described herein are ways to encode (e.g., entropy code) a video sequence to produce multiple descriptions and to decode the multiple descriptions to reproduce the video sequence. In the following description, a method is described for encoding a video sequence into multiple MPEG-4 H.264 scalable video coding (SVC) compliant descriptions, as well as a method for decoding the descriptions to recover a video sequence. SVC is a newer recommendation based on the H.264 advanced video codec (AVC) recommendation. It should be understood that these video standards are examples only. The techniques described herein can easily be used for other coding standards.

The basic principle behind the techniques described herein is that the final combined noise variance of combined descriptions is less than the noise variance of any individual description. Assume x is the original signal, e.g., a portion of a video sequence, and $y_1$ and $y_2$ are two descriptions of the original signal received at a decoder. At least one of the multiple descriptions is encoded from the original signal that has been spatially shifted. Due to quantization noise, the received signals can be represented as follows:

$$y_1 = x + n_1$$

$$y_2 = x + n_2$$

Let the variances of the noise $n_1$ and $n_2$ be denoted as $\sigma_1^2$ and $\sigma_2^2$, respectively. Due to the spatial shift, the quantization noise $n_1$ and $n_2$ are de-correlated and they are approximately independent. Since the noise $n_1$ and $n_2$ are independent, an optimal estimation x' (in the minimum mean-square error (MMSE) sense) of the original signal x is a weighted average of $y_1$ and $y_2$ as follows:

$$x' = \frac{\sigma_2^2}{\sigma_1^2 + \sigma_2^2} \cdot y_1 + \frac{\sigma_1^2}{\sigma_1^2 + \sigma_2^2} \cdot y_2$$

Solving for the total noise variance of the optimal estimation x' yields $$\frac{\sigma_1^2 \sigma_2^2}{\sigma_1^2 + \sigma_2^2},$$

which is less than either of $\sigma_1^2$ and $\sigma_2^2$, and therefore produces a better quality estimation of the original signal at the decoder. As can be seen from the above, the total noise variance is reduced as the number of descriptions rises.

Example Embodiments

Referring first to FIG. 1, a system 100 is shown. The system 100 comprises an encoder device 110 and a decoder device 160. Between the encoder device 110 and the decoder device 160 is a network 150, or other communications link or medium, to allow the two devices to communicate. The encoder device 110 comprises a data processing device 120, an interface unit 130, and a memory 140. Resident in the memory 140 is software configured to execute spatial multiple description generation (SMDG) process logic 500. The SMDG process logic 500 is configured to spatially generate multiple descriptions for a portion of a video sequence. It is to be appreciated that encoder device 110 may employ multiple encoders using software modules, processors, hardware accelerators and/or combinations thereof.

The decoder device 160 comprises a data processing device 180, an interface unit 170, and a memory 190. Resident in the memory 190 is software configured to execute a spatial multiple description combining (SMDC) process logic 600. The SMDC process logic 600 is configured to combine multiple descriptions received at the decoder 160. The SMDG process logic 500 and SMDC process logic 600 will be referred to generally in conjunction with FIGS. 2-4, and described in detail in conjunction with FIGS. 5 and 6, respectively. The decoder device 160 may also employ multiple decoders using software modules, processors, hardware accelerators and/or combinations thereof.

The data processing devices 120 and 180 may be microprocessors, microcontrollers, systems on a chip (SOCs), or other fixed or programmable logic. The memories 140 and 190 may be any form of random access memory (RAM) or other data storage block that stores data used for the techniques described herein. The memories 140, 190 may be separate or part of the processors 120, 180, respectively. Instructions for performing the SMDG process logic 500 may be stored in the memory 140 for execution by the processor 120 and instructions for performing the SMDC process logic 600 may be stored in the memory 190 for execution by the processor 180. The SMDG process logic 500 spatially generates multiple descriptions for a portion of a video sequence for transmission via the interface 130 over the network 150. The various ones of the multiple descriptions may be transmitted over different pathways with similar or different bandwidths via network 150. The SMDC process logic 600 combines the multiple descriptions received at decoder device 160 using techniques described hereinafter. The interface units 130 and 170 enable communication between the encoder device 110 and the decoder device 160, and ultimately to other network elements in the system 100.

The functions of the processors 120 and 180 may be implemented by a processor readable tangible medium encoded with instructions or by logic encoded in one or more tangible media (e.g., embedded logic such as an application specific integrated circuit (ASIC), digital signal processor (DSP) instructions, software that is executed by a processor, etc.), wherein the memories 140 and 190 store data used for the computations or functions described herein (and/or to store software or processor instructions that are executed to carry out the computations or functions described herein). Thus, the SMDG process logic 500 and the SMDC process logic 600 may be implemented with fixed logic or programmable logic (e.g., software or computer instructions executed by a processor or field programmable gate array (FPGA)).

Figure 2:
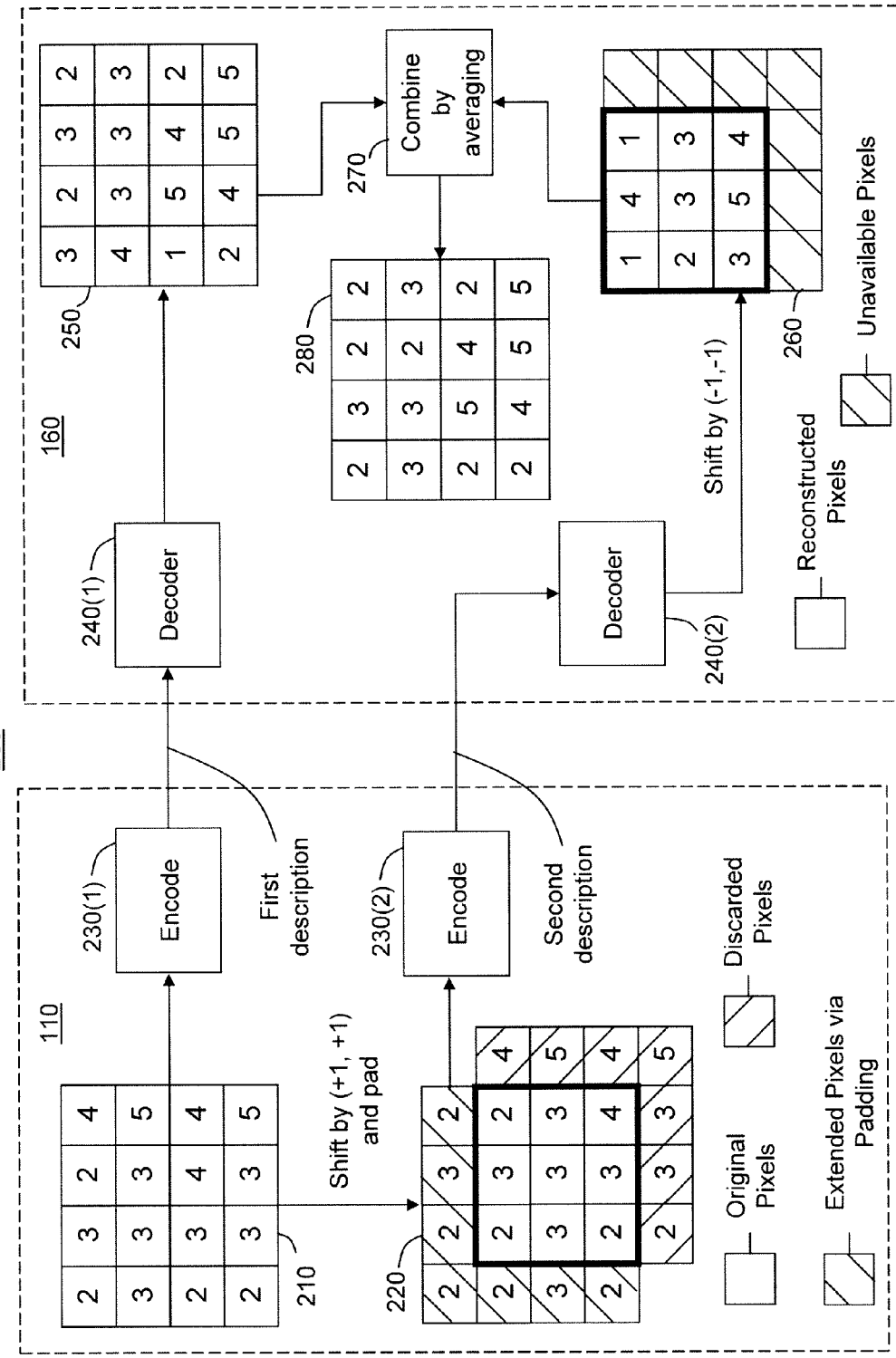
FIG. 2 is a diagram depicting an example process where a portion of a video sequence is encoded to produce multiple descriptions and then the multiple descriptions are decoded to reproduce the portion of the video sequence.

Turning now to FIG. 2, with continued reference to FIG. 1, a diagram depicting an example process 200 for producing multiple descriptions at encoder 110 and combining the multiple descriptions at decoder 160 is described. A video sequence is received at the encoder 110. A portion of the video sequence consisting of a 4×4 pixel block is shown at 210. A portion comprised of a 4×4 block is only an example; other sizes and dimensions are possible. The numbers in the 4×4 pixel block 210 are arbitrary values that represent pixel values for purposes of the description herein. The 4×4 pixel block 210 is encoded at 230(1) to produce a first description and transmitted to the decoder 160, e.g., via network 150, using interface 130. The 4×4 pixel block 210 is shifted by positive one pixel horizontally (to the right) and positive one pixel vertically (downwards), as shown at 220 (the signing convention is arbitrary). The purpose of the shift is to de-correlate the quantization noise between descriptions. The pixels shifted out of the 4×4 pixel block are discarded and the empty pixels created by the shift are filled with padding pixels, as shown for the top row and leftmost column. The padding pixels used to pad the boundaries of the 4×4 pixel block 220 may be pixels of known characteristics or values. For example, pixels from rows may be replicated for horizontal padding and pixels from columns may be replicated for vertical padding, as shown in FIG. 2.

The 4×4 pixel block 220 is encoded at 230(2) to produce a second description and transmitted to the decoder 160. Thus, the padding function described above is performed on the shifted portion prior to encoding at 230(2) to produce the second description. The 4×4 pixel block 210 may be stored in the memory 140 and instantiated or copied, where the copied 4×4 pixel block is then shifted and padded. Thus, 4×4 pixel blocks 210 and 220 may be encoded serially or in parallel, and transmitted to the decoder 160 serially or substantially in parallel.

At 240(1) and 240(2), the first and second descriptions are decoded into pixel blocks 250 and 260, respectively. The numbers in the decoded pixel blocks 250 and 260 are different than the pixel blocks 210 and 220 because of quantization and transmission noise. Pixel block 250 is obtained directly from the decoding function 240(1). Pixel block 260 is obtained after it is decoded at 240(2) and subsequently inverse shifted or unshifted by −1 horizontally (to the left) and by −1 vertically (upwards). This degree of unshifting corresponds to the degree that pixel block 220 was shifted before it was encoded into the second description, but in the opposite direction. At 270, pixel blocks 250 and 260 are combined, such as by an averaging process. A close approximation of the original 4×4 pixel block 210 is reproduced as shown at 280.

Unlike pixel block 220, pixel block 260 may not be padded and empty pixels generated during the unshift may be considered unavailable, i.e., they are not used in the averaging process. The pixels corresponding to the empty pixels are copied from pixel block 250 to pixel block 280, and the non-empty pixels in pixel block 260 are averaged with the corresponding pixels in pixel block 250, as shown in pixel block 280. Although only 4×4 pixel blocks are shown in FIG. 2, multiple descriptions may be generated for a video frame, slice, or any size macroblock. Video portion size may be chosen based on the coder-decoder (codec), available transmission bandwidth, processing capability of the encoders and decoders, or other constraints.

Figure 3:
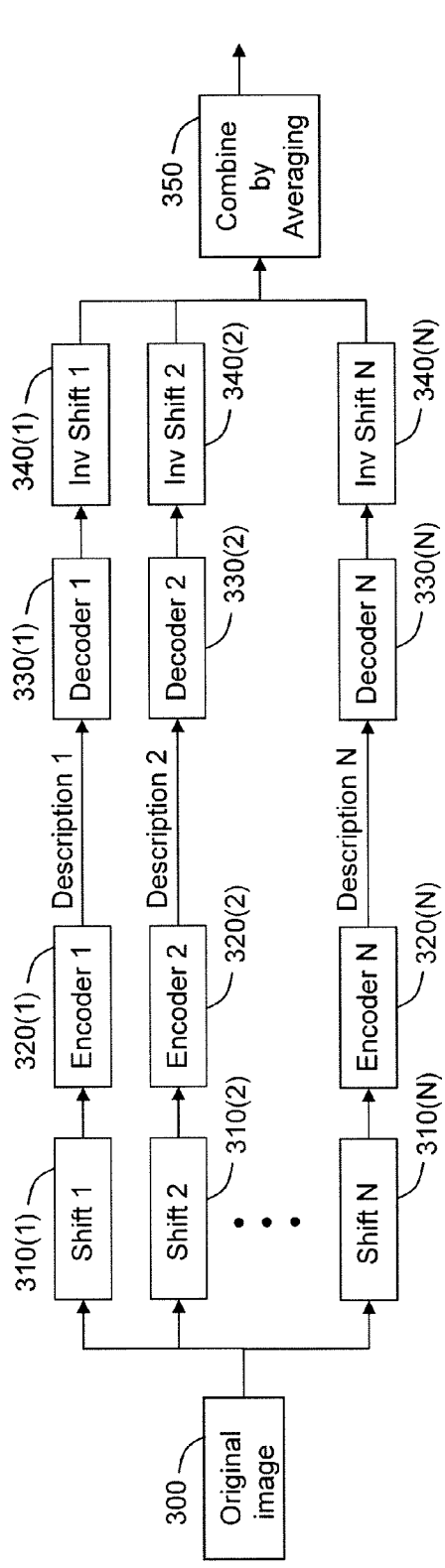
FIG. 3 is a block diagram showing an example of how an original image is encoded multiple times to produce a plurality of video descriptions.

Referring now to FIG. 3, a block diagram showing an example of how an original image is encoded multiple times to produce a plurality of video descriptions. An original image 300 is received at an encoding device. At 310(1)-310(N), the original image 300, or portion thereof, is shifted N different times. Shift 1 may be zero shifting horizontally or vertically, i.e., the original image. The shifting is performed as previously described in conjunction with FIG. 2, and may comprise various positive, negative, or zero integer pixel shifts of the original image 300. The number of pixels shifted horizontally need not equal the number of pixels shifted vertically, e.g., in one case the image may be shifted zero pixels horizontally and −1 pixel vertically, and in another case the image may be shifted −2 pixels horizontally and +1 pixel vertically, and so on. For a shifted image at least one pixel should be shifted horizontally or vertically. The shifted images are then padded to attain the original image size.

The techniques described herein apply to any transform size used during the encoding process, and generally, the number of shifted pixels should not exceed the transform size for any given axis. The coded image (or portion) size and the transform size are independent, and in general the transform size is 4×4, or 8×8, and much smaller than the coded image size. Even if the number of shifted pixels exceeds the transform size image information is still available. However, if the number of shifted pixels is a multiple of the transform size then the quantization noises for different descriptions may no longer be independent, and therefore, may not be de-correlated (or other autocorrelation effects may emerge).

At 320(1)-320(N), the original and shifted images are encoded to produce N descriptions and then transmitted to a decoder device. In this example, the encoded images are transmitted over connections of equal bandwidth. At 330(1)-330(N), the N descriptions are decoded. At 340(1)-340(N), the decoded images are inversely shifted or unshifted by the equivalent number of pixels horizontally and vertically that original image 300 was shifted at 310(1)-310(N). At 350, the unshifted images are combined (e.g., averaged) to obtain the original image 300.

Figure 4:
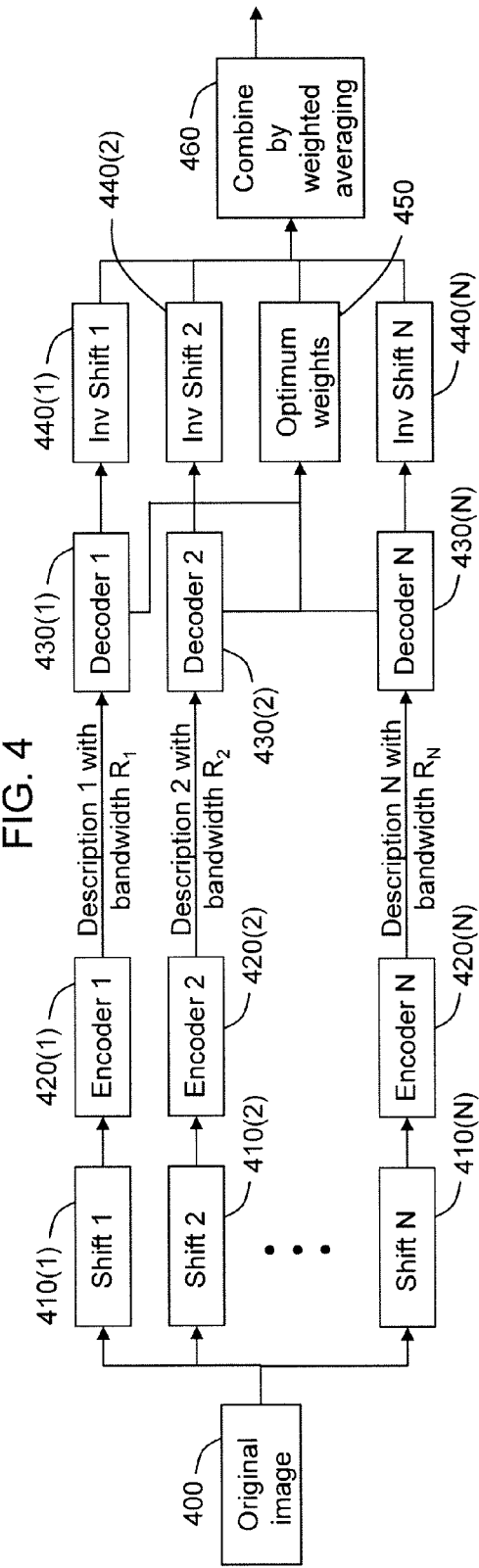
FIG. 4 is a block diagram showing an example of how an original image is encoded multiple times for transmission across connections of various bandwidths to produce a plurality of video descriptions.

Turning to FIG. 4, a block diagram showing an example of how an original image is encoded multiple times for transmission across connections of various bandwidths to produce a plurality of video descriptions. An original image 400 is received at an encoding device. At 410(1)-410(N), the original image 400, or portion thereof, is shifted N times, where shift 1 may be zero shifting. The shifting is performed as previously described in conjunction with FIG. 3. The shifted images are then padded to attain the original image size.

At 420(1)-420(N), the shifted images are encoded to produce N descriptions and then transmitted to a decoder device. In this example, the N descriptions are transmitted over connections of various bandwidths. At 430(1)-430(N), the N descriptions are decoded. At 440(1)-440(N), the decoded images are inversely shifted or unshifted by the equivalent number of pixels horizontally and vertically that original image 400 was shifted at 410(1)-410(N). At 460, the unshifted images are combined by weighted averaging using optimum weights 450 to attain the original image 400. In this example, since the encoded images were transmitted over connections of various bandwidths identified as $R_1$-$R_N$, the decoded images will not contain the same amount of information. At 450, optimum weighting values are determined for the decoded images based on the quantization weights used by the encoder. Derivation of these weighting values is described hereinafter.

FIGS. 3 and 4 illustrate a generalized version of the process shown in FIG. 3 wherein the shifting function is performed on a given portion of a video sequence for each of a plurality of different shifting amounts so as to produce a plurality of shifted portions. Thus, the encoding function involves encoding each of the plurality of shifted portions (after padding pixels are inserted appropriately) to produce a plurality of video descriptions. The video description for the original portion (unshifted) and the video descriptions for each of the shifted portions are then transmitted to the decoder. The decoder reverses these functions as depicted in FIGS. 3 and 4.

Referring to FIG. 5, an example flow chart generally depicting the SMDG process logic 500 used to spatially generating multiple descriptions for a portion of a video sequence with reduced error rate characteristics will be described. In this example, only two descriptions are provided (N=2), but it is understood that this is only by way of example; more descriptions may be employed. At 510, a portion of a video sequence is shifted at an encoding device by a first predetermined number of pixels horizontally and by a first predetermined number of pixels vertically to produce a shifted first portion of the video sequence, where the first predetermined number of pixels horizontally and/or the first predetermined number of pixels vertically may be set to zero. In general the first predetermined number of pixels for the first shift is equal to or greater than zero. In one form, the first video description is generated from an unshifted image, but this may not always be the case. The shifting is performed as previously described in conjunction with FIG. 3. At 520, the shifted first portion of the video sequence is encoded to produce a first video description.

As will be appreciated by those skilled in the art, SVC is scalable in terms of time (temporal scalability), space (spatial scalability), and quality (signal-to-noise ratio (SNR) scalability). Temporal scalability generally relates to frame rate, i.e., how fast to update the image. For example, updating an image or video stream at 60 Hertz (Hz) requires more bandwidth than updating at 15 Hz. Temporal scalability may be controlled by changing the number of predicted images or enhancement layers relative to a base layer, i.e., the size of a group of pictures (GOP). Spatial scalability is based on picture size. For example, a high definition image with a 16:9 aspect ratio may be 1280×720 pixels, a standard definition image with a 4:3 aspect ratio is be 720×576 pixels, and common intermediate format (CIF) images are smaller still. Quality can be varied by changing the quantizer step size (QP) or by selectively removing packets in an enhancement layer.

During the encoding process different QPs may be used to quantize coefficients of the encoded images, e.g., QP25, QP27, QP33, etc. The QPs can be used to scale the images to meet bandwidth requirements of the transmission media as described above. The QPs can also be used to scale the quality of the image. Different QPs may be used when generating multiple descriptions. In these examples, the base layer is used to generate the multiple descriptions because the base layer is the most important layer to receive intact at the decoder, and since enhancement layers are generated at the decoder using the base layer.

Referring again to FIG. 5, at 530, the portion of the video sequence is shifted by a second predetermined number of pixels horizontally and by a second predetermined number of pixels vertically to produce a shifted second portion of the video sequence. The shifting is performed as previously described in conjunction with FIG. 3. At 540, the shifted second portion of the video sequence is encoded to produce a second video description, and at 550, the first video description and the second video description are transmitted. It is possible in one embodiment that the first predetermined number for the first shift (at 520) is nonzero as is the second predetermined for the second shift (at 530), albeit the first and second predetermined numbers are different. In general, for N plurality of video descriptions, each video description is generated from a different shift amount, including the case where one of the video descriptions results from no shifting, as indicated above.

The first and second video descriptions may be transmitted over the same or different connections, i.e., different transmission lines or network connections. In streaming applications, multiple sessions may be streamed. Each session may contain a separate or different description. In non-real time applications, e.g., when automatic repeat request (ARQ) is used to request a corrupted description to be resent, different descriptions may be sent instead of the original corrupted description, thereby improving image quality, e.g., at the decoder.

In addition, bandwidth requirements can be determined for the first and second video descriptions. The bandwidth requirement for each of the first and second video descriptions may be the same or different. The first and second video descriptions may then be quantized using the same or different QPs, or sets of weights, in order to meet the determined bandwidth requirements, as described above in connection with FIG. 4. For example, a first transmission bandwidth requirement for transmitting the first video description is determined and the first video description is quantized with a first set of weights to meet the first transmission bandwidth requirement. Similarly, a second transmission bandwidth requirement for transmitting the second video description is determined and the second video description is quantized with a second set of weights to meet the second transmission bandwidth requirement.

As will be appreciated by those skilled in the art, shifted and encoded descriptions may be generated in response to retransmission requests or automatic repeat requests. By way of example, in the transmission control protocol (TCP), or real time transport protocol (RTP), among other protocols, the same data may be requested multiple times, e.g., when an error or lost packet is detected. For each retransmission request, a new description may be generated from the same portion of the video sequence and originally transmitted (e.g., a first video description) to the destination. Thus, e.g., if TCP requests retransmission after a TCP timeout and one or more additional descriptions (e.g., at least a second video description) are subsequently received at the destination, then the retransmission is not wasted because the additional descriptions can be used to improve quality. For example, the destination device, e.g., a decoder, may then combine the multiple descriptions, and thereby reduce overall error (increase quality), since errors associated with each description will be de-correlated as described above.

Turning now to FIG. 6, an example flow chart generally depicting the SMDC process logic 600 used to spatially combine decoded multiple (e.g., two) descriptions to reproduce a portion of a video sequence is described. At 610, the first video description and the second video description are received at a decoding device. At 620, the first video description is decoded to produce a first decoded description that is an approximation of the original portion of the video sequence. As described above, in general, the first video description will be generated from an unshifted or original portion of the video sequence, and when decoded, is an approximation of the portion of the video sequence. At 630, the first video description is inverse shifted, if necessary, based on the shifting performed at the encoder to produce an unshifted first decoded description. At 640, the second video description is decoded to produce a second decoded description that is an approximation of the shifted portion of the video sequence. At 650, the second video description is inverse shifted based on the shifting performed at the encoder to produce an unshifted second decoded description. At 660, the unshifted first decoded description and the unshifted second decoded description are combined to reproduce the portion of the video sequence. The combining function may involve averaging, and in some cases weighted averaging using predetermined weights. The predetermined weights may be based on quantizing weights used by the encoder.

One example for determining a weight factor w based on encoder QPs is as follows. Denote $$w = \frac{\sigma_1^2}{\sigma_2^2},$$

then, the reconstructed signal x', as described above, can be rewritten as $$x' = \frac{1}{1+w} \cdot y_1 + \frac{w}{1+w} \cdot y_2$$

where $y_1$ and $y_2$ are the two descriptions of the original signal received at a decoder. The ratios of the weight factor w before $y_1$ and $y_2$ in the equation above are the weights to be used for computing a weighted average of the decoded descriptions. That is, $1/(1+w)$ is a weight applied to the first decoded description $y_1$ and $w/(1+w)$ is a weight applied to the second decoded description $y_2$. Since the quantization noise variance depends on the quantization step size, denoted as QStep, which is a deterministic function of the quantization parameter (QP), the weight factor w is computed as follows:

$$w = \frac{\sigma_1^2}{\sigma_2^2} = \frac{QStep^2(QP_1)}{QStep^2(QP_2)}$$

where $QP_1$ and $QP_2$ denote the quantization parameters of the two descriptions. The quantization parameters are generally available at the decoder, so no additional transmission is needed from the encoder. This weight computation and application method may be scaled to any number of descriptions. For any number of N descriptions, the reconstructed signal x' is as follows:

$$x' = \left(\sum_{i=1}^{N} \frac{1}{\sigma_i^2}\right)^{-1} \sum_{i=1}^{N} \frac{y_i}{\sigma_i^2}$$

and the noise variance of the reconstructed signal is $$\left(\sum_{i=1}^{N} \frac{1}{\sigma_i^2}\right)^{-1}.$$

The quantization noise variance $\sigma_i^2$ of each description depends on the quantization step size of each description as defined above.

Techniques are described herein to spatially shift original images and then encode the shifted images to generate multiple descriptions. The multiple descriptions are then transmitted to a decoder, where they are decoded and spatially unshifted and combined. Several advantages are attained by using the above described techniques. Namely, that both quantization and transmission errors are uncorrelated such that when the decoded descriptions are combined the overall error is reduced.

In addition, the encode and transmission rates for each description are nearly identical, which means any additional overhead introduced by shifting versus no shifting is negligible. Another advantage of the techniques described herein compared to other multiple description methods is simplicity and conformance to standards-based encoding/decoding. For example, other multiple description designs, such as multiple description scalar quantization (MDSQ), require a proprietary codec to be implemented which has obvious disadvantages in a commercial setting. Still another multiple description design, multiple description forward error correction (MDFEC), is based on error correction codes. A problem with MDFEC is that if all descriptions are received, no quality improvement is achieved beyond the number of packets needed for perfect error correction. Thus, the techniques described herein provide several advantages over other MDC methods.

Although the subject matter illustrated and described herein as embodied in one or more specific examples, it is nevertheless not intended to be limited to the details shown and described herein, since various modifications and structural changes may be made without departing from the scope and range of equivalents of the claims.

What is claimed is:

1. A method comprising:
   at an encoding device, shifting a portion of a video sequence by a first predetermined number of pixels horizontally and by a first predetermined number of pixels vertically to produce a shifted first portion of the video sequence;
   discarding first portion pixels that have been shifted out of the shifted first portion of the video sequence;
   padding the shifted first portion opposite a discarded first portion pixels side of the video sequence with pixels of known characteristics when either the first predetermined number of pixels horizontally or the first predetermined number of pixels vertically is not equal to zero;
   encoding the shifted first portion of the video sequence to produce a first video description;
   determining a first transmission bandwidth requirement for transmitting the first video description;
   quantizing the first video description with a first set of weights to meet the first transmission bandwidth requirement;
   shifting the portion of the video sequence by a second predetermined number of pixels horizontally and by a second predetermined number of pixels vertically to produce a shifted second portion of the video sequence;
   discarding second portion pixels that have been shifted out of the shifted second portion of the video sequence;
   padding the shifted second portion opposite a discarded second portion pixel side of the video sequence with pixels of known characteristics prior to encoding the shifted second portion of the video sequence to produce a second video description;
   encoding the shifted second portion of the video sequence to produce the second video description;
   determining a second transmission bandwidth requirement for transmitting the second video description;
   quantizing the second video description with a second set of weights to meet the second transmission bandwidth requirement; and
   transmitting the first video description and the second video description.

2. The method of claim 1, further comprising:
   receiving at a decoding device the first video description and the second video description;
   decoding the first video description to produce a first decoded description;
   unshifting the first decoded description by the first predetermined number of pixels horizontally and by the first predetermined number of pixels vertically to produce an unshifted first decoded description;
   decoding the second video description to produce a second decoded description;
   unshifting the second decoded description by the second predetermined number of pixels horizontally and by the second predetermined number of pixels vertically to produce an unshifted second decoded description; and
   combining the unshifted first decoded description and the unshifted second decoded description to reproduce the portion of the video sequence.

3. The method of claim 2, wherein combining comprises weighted averaging the unshifted first decoded description and the unshifted second decoded description with predetermined weights to reproduce the portion of the video sequence.

4. The method of claim 3, wherein the predetermined weights are based on quantizing weights used by the encoder.

5. The method of claim 1, wherein the portion of the video sequence comprises a video frame, a video slice, or a video macro-block.

6. The method of claim 1, further comprising shifting the portion of the video sequence a plurality of different shifting amounts so as to produce a plurality of shifted portions;
   encoding each of the plurality of shifted portions to produce a plurality of video descriptions; and
   transmitting the plurality of video descriptions.

7. The method of claim 6, wherein shifting, encoding, and transmitting the second video description comprises shifting, encoding, and transmitting the second video description in response to a retransmission or repeat request sent from a destination device to which the first video description is transmitted.

8. The method of claim 1, further comprising:
   receiving a message configured to request retransmission of a video description; and
   retransmitting the requested video description.

9. The method of claim 8, wherein receiving the message comprises receiving an automatic repeat request.

10. The method of claim 9 further comprising:
    decoding the first video description;
    decoding the second video description;
    decoding the retransmitted video description; and
    combining the decoded first video description, the decoded second video description and the decoded retransmitted video description.

11. A method comprising:
    receiving at a decoding device a first video description and a second video description;
    decoding the first video description to produce a first decoded description;
    discarding a first predetermined number of pixels horizontally and a first predetermined number of pixels vertically from the first decoded description, wherein the first predetermined number of discarded vertical pixels and first predetermined number of discarded horizontal pixels have known characteristics;

unshifting the first decoded description by the first predetermined number of pixels horizontally in a first discarded horizontal pixel side direction and by the first predetermined number of pixels vertically in a first discarded vertical pixel side direction to produce an unshifted first decoded description;
decoding the second video description to produce a second decoded description;
discarding a second predetermined number of pixels horizontally and a second predetermined number of pixels vertically from the first decoded description, wherein the second predetermined number of discarded vertical pixels and second predetermined number of discarded horizontal pixels have known characteristics;
unshifting the second decoded description by the second predetermined number of pixels horizontally in a second discarded horizontal pixel side direction and by the second predetermined number of pixels vertically in a second discarded vertical pixel side direction to produce an unshifted second decoded description; and
combining the unshifted first decoded description and the unshifted second decoded description by computing a weighted average of the unshifted first decoded description and the unshifted second decoded description with predetermined weights to reproduce the portion of the video sequence, wherein the predetermined weights are proportional to quantizing step values used by an encoder.

12. An apparatus comprising:
a network interface unit configured to enable communication over a network; and
a processor coupled to the network interface unit and configured to:
  shift a portion of a video sequence by a first predetermined number of pixels horizontally and by a first predetermined number of pixels vertically to produce a shifted first portion of the video sequence;
  discard first portion pixels that have been shifted out of the shifted first portion of the video sequence;
  pad the shifted first portion opposite a discarded first portion pixels side of the video sequence with pixels of known characteristics when either the first predetermined number of pixels horizontally or the first predetermined number of pixels vertically is not equal to zero;
  encode the shifted first portion of the video sequence to produce a first video description;
  determine a first transmission bandwidth requirement for transmitting the first video description;
  quantize the first video description with a first set of weights to meet the first transmission bandwidth requirement;
  shift the portion of the video sequence by a second predetermined number of pixels horizontally and by a second predetermined number of pixels vertically to produce a shifted second portion of the video sequence;
  discard second portion pixels that have been shifted out of the shifted second portion of the video sequence;
  pad the shifted second portion opposite a discarded second portion pixel side of the video sequence with pixels of known characteristics prior to encoding the shifted second portion of the video sequence to produce a second video description;
  encode the shifted second portion of the video sequence to produce the second video description;
  determine a second transmission bandwidth requirement for transmitting the second video description;
  quantize the second video description with a second set of weights to meet the second transmission bandwidth requirement; and
  transmit the first video description and the second video description over the network via the network interface unit.

13. The apparatus of claim 12, wherein the processor is further configured to:
receive a message configured to request retransmission of a video description; and
retransmit the requested video description.

14. A system comprising the apparatus of claim 12, and further comprising a decoder comprising a network interface unit and a processor, wherein the processor of the decoder is configured to:
receive the first video description and the second video description via the network interface unit of the decoder;
decode the first video description to produce a first decoded description;
unshift the first decoded description by the first predetermined number of pixels horizontally and by the first predetermined number of pixels vertically to produce an unshifted first decoded description;
decode the second video description to produce a second decoded description;
unshift the second decoded description by the second predetermined number of pixels horizontally and by the second predetermined number of pixels vertically to produce an unshifted second decoded description; and
combine the unshifted first decoded description and the unshifted second decoded description to reproduce the portion of the video sequence.

15. The system of claim 14, wherein the processor is configured to combine by computing a weighted average of the unshifted first decoded description and the unshifted second decoded description using predetermined weights to reproduce the portion of the video sequence.

16. The system of claim 15, wherein the processor is configured to use the predetermined weights that are based on quantizing weights used by the encoder.

17. The method of claim 12, further comprising:
determining whether a corrupted video description was received; and
requesting that the video description corresponding to the corrupted video description be resent.

18. A non-transitory processor readable medium encoded with instructions that, when executed by a processor, cause the processor to:
shift a portion of a video sequence by a first predetermined number of pixels horizontally and by a first predetermined number of pixels vertically to produce a shifted first portion of the video sequence;
discard first portion pixels that have been shifted out of the shifted first portion of the video sequence;
pad the shifted first portion opposite a discarded first portion pixels side of the video sequence with pixels of known characteristics when either the first predetermined number of pixels horizontally or the first predetermined number of pixels vertically is not equal to zero;
encode the shifted first portion of the video sequence to produce a first video description;
determine a first transmission bandwidth requirement for transmitting the first video description;

quantize the first video description with a first set of weights to meet the first transmission bandwidth requirement;

shift the portion of the video sequence by a second predetermined number of pixels horizontally and by a second predetermined number of pixels vertically to produce a shifted second portion of the video sequence;

discard second portion pixels that have been shifted out of the shifted second portion of the video sequence;

pad the shifted second portion opposite a discarded second portion pixel side of the video sequence with pixels of known characteristics prior to encoding the shifted second portion of the video sequence to produce a second video description;

encode the shifted second portion of the video sequence to produce the second video description;

determine a second transmission bandwidth requirement for transmitting the second video description;

quantize the second video description with a second set of weights to meet the second transmission bandwidth requirement; and transmit the first video description and the second video description.

19. The non-transitory processor readable medium of claim 18, wherein the instructions that shift and encode the portion of the video sequence comprise instructions that cause the processor to shift and encode a video frame, a video slice, or a video macro-block.

20. A non-transitory processor readable medium encoded with instructions that, when executed by a processor, cause the processor to:

receive at a decoding device a first video description and a second video description;

decode the first video description to produce a first decoded description comprising;

discard a first predetermined number of pixels horizontally and a first predetermined number of pixels vertically pixels from the first decoded description, wherein the first predetermined number of discarded vertical and horizontal pixels have known characteristics;

unshift the first decoded description by the first predetermined number of pixels horizontally in a first discarded horizontal pixel side direction and by the first predetermined number of pixels vertically in a first discarded vertical pixel side direction to produce an unshifted first decoded description;

decode the second video description to produce a second decoded description;

discard a second predetermined number of pixels horizontally and a second predetermined number of pixels vertically pixels from the second decoded description, wherein the second predetermined number of discarded vertical and horizontal pixels have known characteristics;

unshift the second decoded description by the second predetermined number of pixels horizontally in a second discarded horizontal pixel side direction and by the second predetermined number of pixels vertically in a second discarded vertical pixel side direction to produce an unshifted second decoded description; and combine the unshifted first decoded description and the unshifted second decoded description by computing a weighted average of the first decoded description and the unshifted second decoded description with predetermined weights to reproduce the portion of the video sequence, wherein the predetermined weights are proportional to quantizing step values used by an encoder.

21. The non-transitory processor readable medium of claim 20, further encoded with instructions that, when executed by a processor, cause the processor to:

determine whether a corrupted video description was received; and request that a video description corresponding to the corrupted video description be resent.

* * * * *